(12) United States Patent
Salamat

(10) Patent No.: US 7,419,004 B2
(45) Date of Patent: Sep. 2, 2008

(54) METHOD OF GRAVEL PACKING WITH OIL-BASED CARRIER FLUID

(75) Inventor: Golchehreh Salamat, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 204 days.

(21) Appl. No.: 10/707,658

(22) Filed: Dec. 30, 2003

(65) Prior Publication Data

US 2005/0139354 A1    Jun. 30, 2005

(51) Int. Cl.
    *E21B 43/04* (2006.01)
(52) U.S. Cl. .................................. 166/278; 166/51
(58) Field of Classification Search ............. 166/278, 166/51
    See application file for complete search history.

(56) References Cited

U.S. PATENT DOCUMENTS 3,753,903 A * 8/1973 Fischer et al. ............ 507/114
4,945,991 A   8/1990 Jones ....................... 166/278
6,110,874 A   8/2000 Van Slyke ................ 507/103
6,631,764 B2 * 10/2003 Parlar et al. .............. 166/278

FOREIGN PATENT DOCUMENTS

WO    94/28086    12/1994
WO    96/37683    11/1996

OTHER PUBLICATIONS

SPE 17161—Solids-Free Brine-in-Oil Emulsions for Well Completion by A.M. Ezzat and S.R. Blattel.

* cited by examiner

*Primary Examiner*—William Neuder
*Assistant Examiner*—Nicole Coy
(74) *Attorney, Agent, or Firm*—Thomas O. Mitchell; David Cate; Robin Nava

(57) ABSTRACT

A method is disclosed for gravel packing a hole in a subterranean formation including the step of pumping into the hole a gravel pack composition comprising gravel and a carrier fluid comprising a brine-in-oil emulsion, said emulsion being stabilized by an emulsifier based on at least one sorbitan fatty acid ester presenting a shoulder peak before the peak depicted to be the monomer peak when analyzed by gel permeation chromatography. The emulsifiers that exhibit the shoulder exhibit good stability without causing formation damage.

10 Claims, 3 Drawing Sheets

METHOD OF GRAVEL PACKING WITH OIL-BASED CARRIER FLUID

TECHNICAL FIELD OF THE INVENTION

This invention relates to compositions and methods used in completing oil and gas wells, especially wells having deviated or horizontal boreholes.

BACKGROUND OF THE INVENTION

Hydrocarbon fluids such as oil and natural gas are obtained from a subterranean geologic formation, i.e., a reservoir, by drilling a well that penetrates the hydrocarbon-bearing formation. Once a wellbore has been drilled, the well must be completed; a completion involves the design, selection, and installation of equipment and materials in or around the wellbore for conveying, pumping, or controlling the production or injection of fluids. After the well has been completed, production of oil and gas can begin.

In deep wells, reliability of the sand face completion is very important, due to the prohibitively high cost of intervention. Further, many such wells are completed open hole. Therefore, gravel packing of open-hole horizontal wells is increasingly becoming a standard practice in the deep-water, sub-sea completion environment. The gravel packing process involves pumping into the well a carrier fluid that contains the necessary amount of gravel. Consequently, gravel is deposited adjacent an open hole, for instance at one end of the wellbore, where it serves to prevent sand from flowing into the wellbore.

Proper selection of the carrier fluid is essential. Ideally, the carrier fluid shall not cause any permeability reduction of the formation. When viscous fluids are used, carrier fluid must also have sufficient viscosity to suspend and carry the gravel during placement. Carrier fluids are either considered "water-based" or "oil-based" depending on the constituency of their external continuous phase; the term "oil based" fluids may thus be used to designate fluids having a continuous phase based on synthetic or non-synthetic oil and eventually, an aqueous phase dispersed in the oil phase, said aqueous phase being more properly designed as a brine.

Aqueous-base fluids can be tailored to be compatible with most formations simply by including salts such as potassium chloride or ammonium chloride. Consequently, to date, the convention in gravel-packing such horizontal wells has been water packing or shunt-packing with water-based viscous fluids. A carrier fluid is thus typically a brine comprising a gelling agent such as hydroxyethylcellulose (HEC), xanthan or a viscoelastic surfactant; breakers to minimize the pressure required to move the fluid back to the wellbore.

However, aqueous gravel pack fluids are poorly compatible with oil-based drilling fluids. To ensure compatibility and improve wellbore cleanup, a common practice is to use a water-based reservoir drilling fluid for the section of the well to be gravel-packed. However, the use of a water-based drilling fluid is not always suitable or the best recommended practice. Indeed, oil-base drilling fluids provide shale inhibition, lubrication, gauge hole, and higher rates of penetration lubricity and deeper bit penetration and therefore, may often be preferred over water-base fluids.

Solids-free brine-in-oil emulsions for well completion are known from SPE Paper 17161. These emulsions consist of an aqueous brine phase dispersed as fine droplets in a base oil, where the droplets are stabilized through a surfactant/emulsifier that forms films around the water droplets produced when water is added with shears to the oil phase containing the emulsifier. The emulsion viscosity is linked to the number and volume of droplets present and also the emulsifier concentration. In this paper, the used emulsifier is a polymerized nonionic surfactant with lipophilic and hydrophilic groups attached to a straight backbone. Its molecular weight is between 6,000 and 10,000.

An oil-based emulsion gravel-pack carrier fluid was also reported in SPE Paper 64978 that further discusses the possibility of adding a chelating agent solution to the internal phase that is for instance released by breaking the emulsion. This paper further depicts the effect of mixing energy on emulsion viscosity and the sand carrying properties of this oil-based emulsion fluid. However this paper is silent as to the choice of the emulsifier and the authors of the present invention have found that proper selection of said emulsifier was indeed critical for providing an effective oil-based emulsion gravel-pack carrier fluid. It is well known that commercial emulsifiers such as fatty acid esters are often blends of the mono, di, tri etc. esters, and also may be prepared under uncontrolled or different reaction conditions with differing temperatures, reactants, catalysts, etc. Thus, there is a need for a way to predict or determine whether or not a particular emulsifier will be effective in an oil-based emulsion gravel-pack carrier fluid.

SUMMARY OF THE INVENTION

One aspect of the invention is a method of gravel packing a hole in a subterranean formation including the step of pumping into the hole a gravel pack composition comprising gravel and a carrier fluid comprising a brine-in-oil emulsion, said emulsion being stabilized by an emulsifier based on at least one sorbitan fatty acid ester presenting a shoulder peak before the peak depicted to be the monomer peak when analyzed by gel permeation chromatography (which typically occur between about 26 and about 28 minutes depending on the used gel permeation chromatograph.

Injection of this gravel pack composition into the wellbore results in simultaneous deposition of gravel at or adjacent to the open hole and removal of sufficient filter cake—when containing a cleaning agent—to establish a fluid flow path between the wellbore and the formation. This method is especially useful in wellbores that are drilled with an oil based reservoir drilling fluid and completed open hole, particularly in horizontal boreholes. The present invention has several benefits as compared to prior art gravel packing methods and carrier fluids, including reduced cost, improved fluid management practices, and increased productivity and/or reduced risk of future interventions, by mitigating against the risk of sand face failure.

DETAILED DESCRIPTION OF PREFERRED EMBODIMENTS

Figure 1:
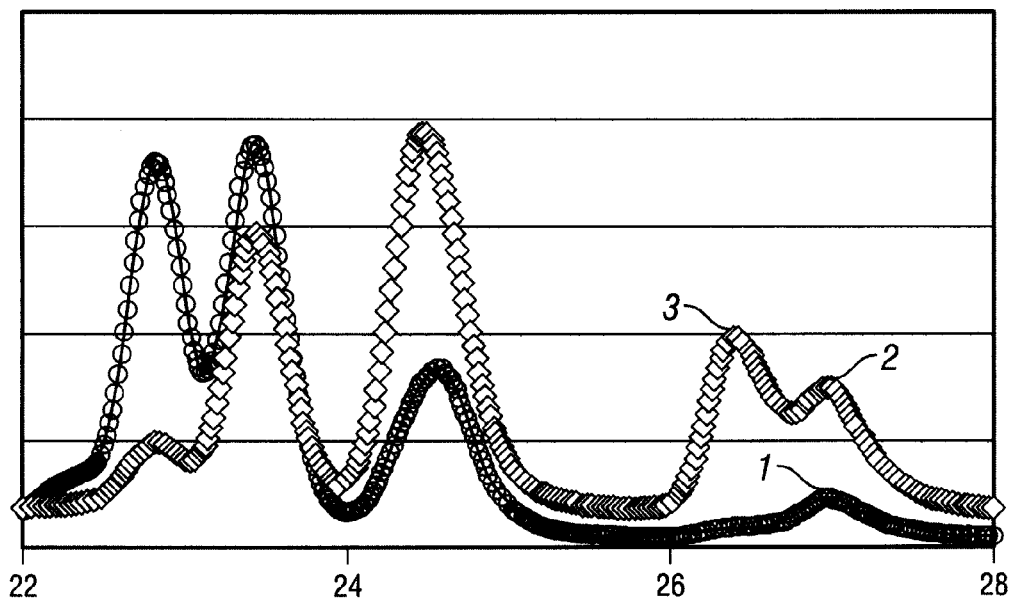
FIG. 1 shows typical chromatographic graphs.

Gravel pack compositions of the present invention comprise gravel and a carrier fluid. Preferably the gravel pack carrier fluids have a density that is sufficient to allow the fluid to control the well during well completion operations, since open-hole gravel packing is done almost exclusively in circulating position. Typical fluid densities for the carrier fluid are from about 8.8 ppg (pounds per gallon) up to about 19.2 ppg, more preferably about 8.8 ppg up to 14.2 ppg.

The rheology characteristics of the fluid must be such that the fluid system is able to carry and suspend gravel. The gravel will for instance have a U.S. mesh size of between about 20/40 and 40/70. Gravel suspension characteristics preferably are comparable to those provided by aqueous gravel carrier fluids. The fluid system preferably exhibits acceptable friction pressures (pumpability).

The carrier fluid system should be compatible with typical oil based mud and mud additives, so that no thick emulsions or sludges are formed that could damage formations and decrease well production. Thus, for example, the oil phase of the carrier fluid can comprise the same type of oil as the one used in the oil based drilling fluid. Therefore, synthetic oil—comprised for instance of oligomerized olefins—will be preferably used for the carrier fluid if the well was drilled with a synthetic oil based drilling fluid. In addition, the fluid system should have an acceptable health, safety, and environmental profile. The oil of the emulsion can be either synthetic oil (e.g., oligomerized olefin) or naturally occurring oil.

The carrier fluids according to the invention are brine-in-oil based fluids, comprising between about 50% and 80% by volume aqueous phase. The internal aqueous phase is preferably completely solids-free and may include a solution of a pH-modifier as well as a dissolver for the bridging agents from the drilling fluid. The pH-modifying property of the internal phase provides a mechanism for breaking the synthetic oil based-reservoir drilling fluid emulsion remaining in the reservoir drilling fluid filter cake. Breaking the emulsion in the filter cake allows the bridging agents and drilling fluid solids to become water-wet, ensuring dissolution of the bridging agents. Thus, the gravel pack carrier fluid provides the chemicals necessary to remove filter cake in order to establish a conductive flow path between the well bore and the formation of interest, while acting as a carrier for the gravel.

In certain embodiments, the pH modifying agent used to destabilize (e.g., break) the emulsion in the filter cake also enhances the solubility of drilling fluid bridging/weighting agents that are present in the filter cake, and acts as a dissolver of solids in the filter cake. Suitable pH modifying agents include mineral acids (such as hydrochloric acid), organic acids (such as formic acid, acetic acid, or citric acid), and chelating agents, in particular cationic salts of polyaminocarboxylic acids chelating agents suitable typically using at neutral or mild pH, ranging from 3.5 to 8.0. Examples of chelating agents include aqueous solutions comprising di-cationic salts (and preferably di-potassium salts) of ethylenediaminetetraacetic acid (EDTA), cyclohexylene dinitrilo tetraacetic acid (CDTA), [Ethylenebis(oxyethylenenitrilo)]tetraacetic acid (EGTA, also known as Ethyleneglycol-bis-(beta-aminoethyl ether) N,N'-tetraacetic acid) and [(Carboxymethyl) imino]-bis(ethylenenitrilo)]-tetra-acetic acid (DTPA, also known as Diethylenetriaminepenta-acetic acid), hydroxyethylethylenediaminetriacetic acid (HEDTA), and hydroxyethyliminodiacetic acid (HEIDA) in a form of free acid or salt. Some of the above mentioned chelants can also be used in an alkaline pH range and thus could be used with filter cake from a drilling fluid emulsion that is stable at low pH and unstable at high pH. EDTA can also be used in an alkaline pH range and thus could be used with filter cake from a drilling fluid emulsion that is stable at low pH and unstable at high pH.

Optionally, the carrier fluid can further contain one or more additives such as surfactants, corrosion inhibitors, breaker aids, salts (e.g., potassium chloride), anti-foam agents, scale inhibitors, emulsifiers (at between about 0.5 and 3 wt % of the carrier fluid), organophilic clays and bactericides. The parameters used in selecting the brine to be used in a particular well are known in the art, and the selection is based in part on the density that is required of the gravel pack carrier fluid in a given well. Brines that may be used in the present invention can comprise $CaCl_2$, $CaBr_2$, NaBr, NaCl, KCl, potassium formate, ZnBr or cesium formate, among others. Brines that comprise $CaCl_2$, $CaBr_2$, and potassium formate are particularly preferred for high densities.

Specific techniques and conditions for pumping a gravel pack composition into a well are known to persons skilled in this field. The conditions which can be used for gravel-packing in the present invention include pressures that are above fracturing pressure, particularly in conjunction with the Alternate Path Technique, known for instance from U.S. Pat. No. 4,945,991, and according to which perforated shunts are used to provide additional pathways for the gravel pack slurry. Furthermore, certain oil based gravel pack compositions of the present invention with relatively low volume internal phases (e.g., discontinuous phases) can be used with alpha- and beta-wave packing mechanisms similar to water packing.

Example 1

Six surfactants based on sorbitan fatty acid esters were tested and analyzed by gel chromatography. The column set used to separate the molecular weight components by size is a one 50 Angstrom and three 100 Angstrom Phenomenex GPC columns in series such (i.e. Phenogel 5 micron particles, 300 mm×7.8 mm columns). Tetrahydrofuran is the system solvent flowing at a flow rate of 1.0 ml per minute. Samples are dissolved at about 1% by weight concentration in tetrahydrofuran and 50 microliters of dissolved sample is injected into the HPLC system. A Water's 410 Differential Refractive Index Detector is used in conjunction with a Shimadzu High Performance Liquid Chromatographic System, the LC-10A series. The data were collected by a Thermo LabSystems. Inc. Atlas system and processed by Polymer Laboratories Inc. PL Cirrus software for gel permeation chromatography data.

FIG. 1 shows two types of responses between about 22 and about 28 minutes. In both cases, a series of peaks are observed between about 22 and about 26 minutes which are depicted to correspond to the dialkylester, the trialkylester and tetraalkylester which are also referred to in the art as the dimer and trimer and tetromer. The last peak to be observed in that period of time is a little before 28 minutes and is depicted to be the low molecular weight or the monomer (monoester) peak. Note that depending on the chromatography equipment, and on the nature and weight of the polyester, the peaks may appear slightly earlier or later, in other words, all peaks are shifted towards earlier or later time, but the monomer (monoester) peak remains always present. With the first surfactant (open circles), no other peak can be detected before the peak 1 between about 26 and 28 minutes. In the second case on the other hand (full squares), a shoulder peak is clearly identified (indeed, the shoulder peak 3 is greater than the monomer peak 2).

Figure 2:
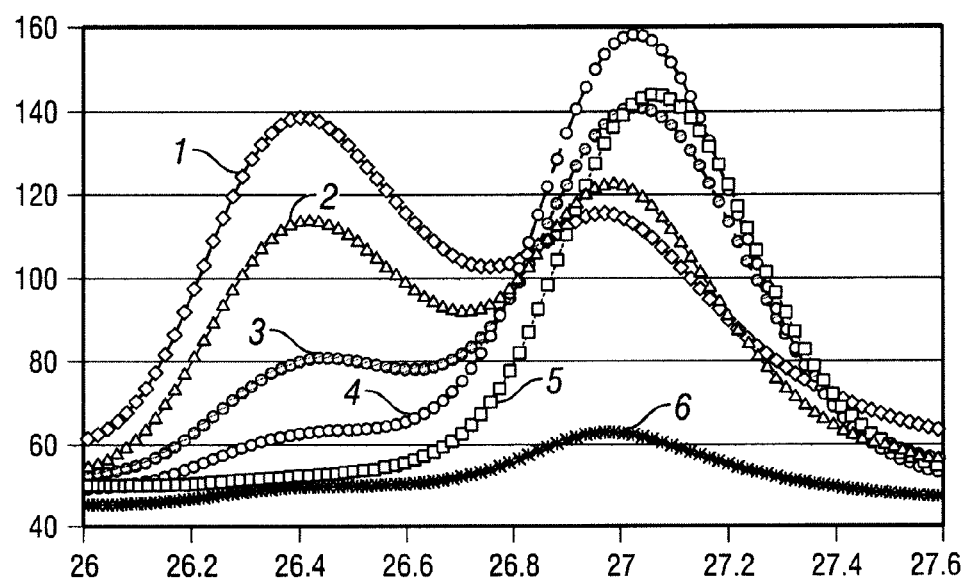
FIG. 2 is a zoom of the chromatogram near the low peak for 6 tested formulations.

FIG. 2 shows a detail of the graph near the monomer peak and just before, in other words during the period of time just before the peek attributed to the sorbitan monomer (ie monooleate). Some of the tested surfactants clearly exhibit a shoulder peak. This is in particular the case with #1 commercialized as sorbitan monooleate. Surfactants #2 and #3 also exhibit a shoulder peek, even if smaller than #1. The last tested surfactants, #4, #5 and #6 exhibit virtually no response during that period of time. To be noted that #6 is commercialized as sorbitan trioleate.

The suspension properties of emulsions made from different surfactants were tested. In the tests described below, the emulsion fluid was typically a brine in a low molecular weight mineral oil formulated with oil/water ratios of 29/70 and containing 1 volume percent emulsifier. The formulation of the tested suspension is shown below in Table 1.

TABLE 1

|  | Tested emulsion fluid |
| --- | --- |
| Oil/Brine (Vol./Vol.) | 29/70 |
| Oil Type | Mineral oil |
| Brine Type | CaCl2 |
| Brine density | 11.6 lb/gallon |
| Emulsifier (volume percent) | 1 |

Figure 3:
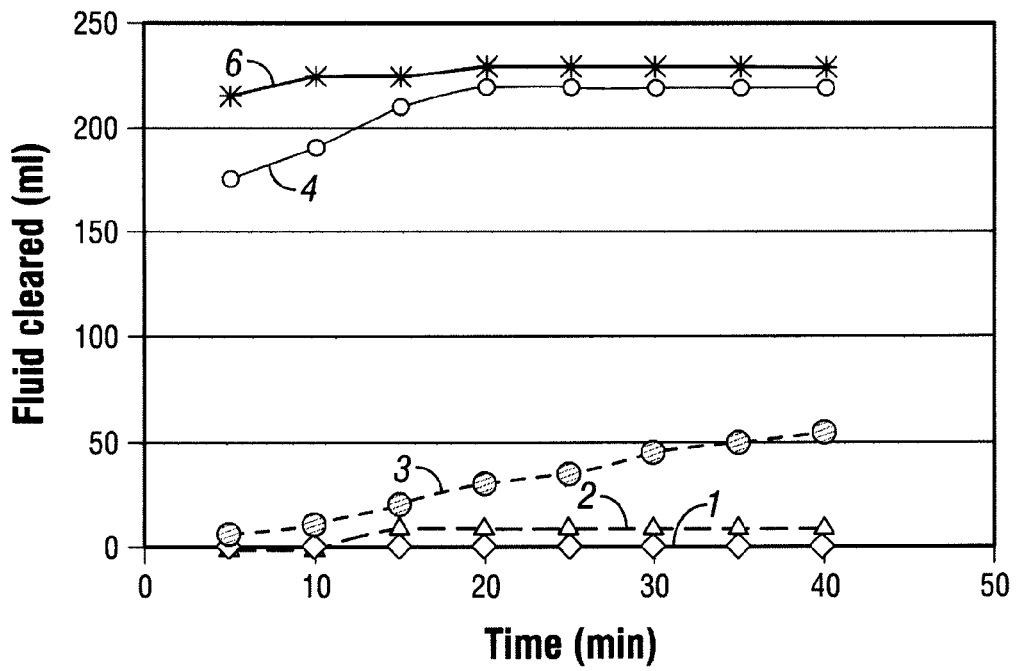
FIG. 3 shows the result of a test that illustrate the sand suspension properties for emulsions prepared with the different surfactant formulations of FIG. 2.

Emulsion fluids were heated in water bath at 150° F. for an hour and a half. Sand (20/40) was heated in the oven at 150° F. 355 grams of sand was then added to 500 ml of emulsion in a container. The container was then shaken vigorously and the slurry was poured into a graduated cylinder up to the 500 ml mark. The cylinder was then placed in an oven at 150° F. The height of slurry (expressed in ml) with no sand suspension was recorded along time and is shown FIG. 3. System based on surfactants #1, #2 and #3 perform well while systems based on surfactants #4 and #6 are clearly not acceptable. Surfactant #4 on GPC shows a faint shoulder peak. It was discovered that if the concentration of surfactant #4 is increased by 10-20% in the emulsion, the emulsion performs similar to surfactant #3 in FIG. 3 in terms of suspending sand. In other words, by increasing the amount of surfactant #4 we have increased the concentration of the molecule with shoulder peak (foot prints at 26.4 minutes in the present case) and restored the good sand suspension.

Figure 4:
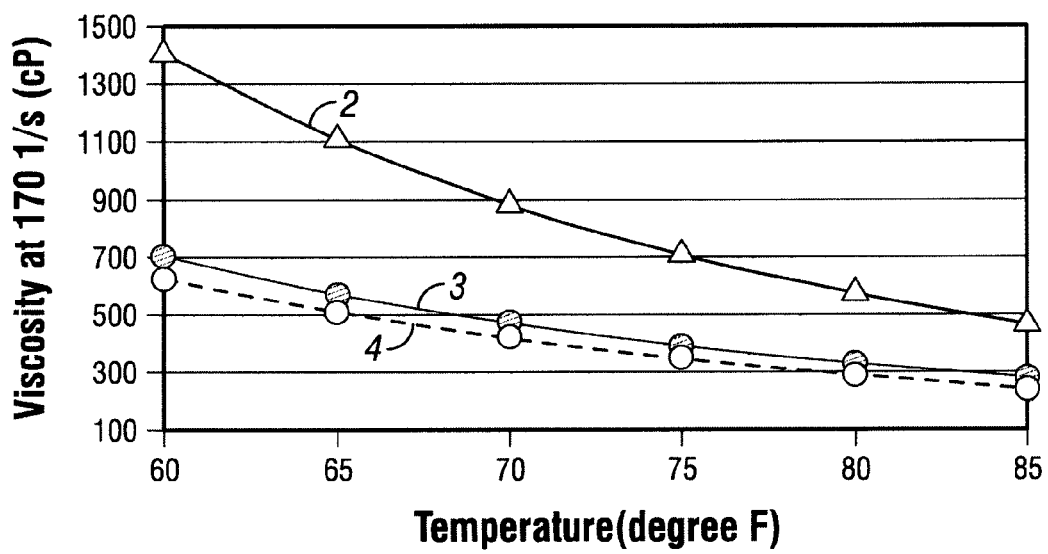
FIG. 4 shows the viscosity of the pure surfactant formulations as function of the temperature.

FIG. 4 shows the viscosity of pure surfactants as a function of temperature at 170 l/s from 60° F. to 85° F. This result can be correlated to sand settling results shown in FIG. 3. That is the surfactant which shows higher viscosity values across the temperature range also performs better when it is used to form an emulsion to suspend sand. It is believed (without being hold on to it) that the higher viscosity values in #2 is due to the presence of the molecule that shows up at 26.4 minutes on the GPC. Surfactant #2 in FIG. 4 has the second lowest sand settling rate at 40 minutes.

Figure 5:
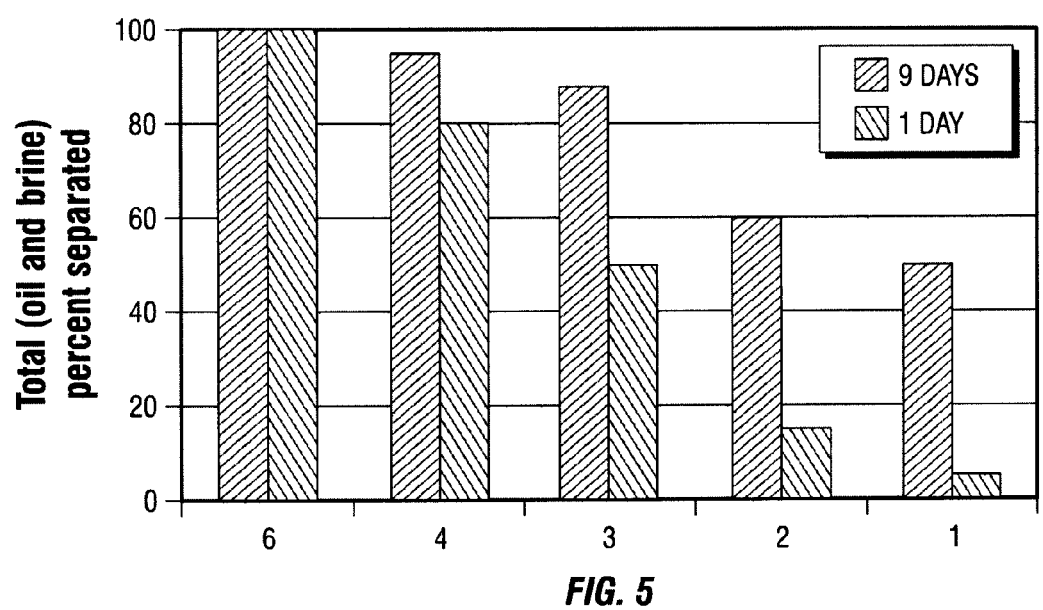
FIG. 5 compares the stability of different emulsions after 1 and 9 days/

In the last series of experiments, the stability of the emulsion after a medium (1 day) time and long time (9 days) was tested. The emulsions were made with different variant of commercial sorbitan oleate esters having different peaks. FIG. 5 shows the percentage of volume broke out in 1 and 9 days at 150° F. Again, the tests show that the higher the shoulder peak, the higher the stability. Indeed, the suspension based on "pure" monooleate sorbitan (the chromatogram shows the presence of other fatty acid ester species) may be considered too stable and causing formation damage. Therefore, the suspension having a peak between 4 and 2 may be more suitable.

The preceding description of specific embodiments of the present invention is not intended to be a complete list of every possible embodiment of the invention. Persons skilled in this field will recognize that modifications can be made to the specific embodiments described here that would be within the scope of the present invention.

The invention claimed is:

1. A method of gravel packing a hole in a subterranean formation including the step of analyzing a brine-in-oil emulsion forming emulsifier by gel permeation chromatography and selecting the emulsifier based on the criteria that the emulsifier is a sorbitan fatty acid ester presenting a shoulder peak before the peak depicted to be the monomer peak in said analysis, and pumping into the hole a gravel pack composition consisting essentially of gravel and a brine-in-oil emulsion carrier fluid, wherein the brine-in-oil emulsion is stabilized by the selected emulsifier, wherein stability of the brine-in-oil emulsion is proportional to the height of the shoulder peak relative to the monomer peak.

2. The method of claim 1, wherein the sorbitan fatty acid ester includes sorbitan monooleate.

3. The method of claim 2 wherein the emulsifier comprises a mixture of sorbitan fatty acid esters.

4. The method of claim 1, wherein the ratio of the peak height of the shoulder peak before the peak depicted to be the monomer peak to the peak height of the peak depicted to be the monomer peak is greater than 0.5.

5. The method of claim 1, wherein the brine phase is about 50-80% by volume of the carrier fluid.

6. The method of claim 1, wherein the aqueous phase of the carrier fluid further comprises a chelating agent.

7. The method of claim 6, wherein the chelating agent is selected from the group consisting of di-cationic salts of ethylenediaminetetraacetic acid (EDTA), cyclohexylene dinitrilo tetraacetic acid (CDTA), [ethylenebis(oxyethylenenitrilo)]tetraacetic acid (EGTA) and [(carboxymethyl)imino]-bis(ethylenenitrilo)]-tetra-acetic acid, hydroxyethylethylenediaminetriacetic acid (HEDTA) and hydroxyethyliminodiacetic acid (HEIDA).

8. The method of claim 1 wherein the brine-in-oil emulsion comprises an aqueous phase, the aqueous phase being solids-free.

9. The method of claim 1 wherein the brine-in-oil emulsion comprises an aqueous phase, the aqueous phase comprising a pH-modifier and a dissolver.

10. The method of claim 1 wherein the emulsifier comprises a mixture of sorbitan fatty acid esters.

* * * * *